United States Patent
Sajassi et al.

(10) Patent No.: US 11,388,084 B2
(45) Date of Patent: Jul. 12, 2022

(54) ETHERNET VIRTUAL PRIVATE NETWORK ATTACHMENT CIRCUIT AWARE VIRTUAL LOCAL AREA NETWORK BUNDLE SERVICE

(71) Applicant: Cisco Technology, Inc., San Jose, CA (US)

(72) Inventors: Ali Sajassi, San Ramon, CA (US); Mankamana P. Mishra, Dublin, CA (US); Samir Thoria, Saratoga, CA (US); Patrice Brissette, Gatineau (CA); Mei Zhang, Cary, NC (US); Tapraj Singh, Danville, CA (US)

(73) Assignee: Cisco Technology, Inc., San Jose, CA (US)

(*) Notice: Subject to any disclaimer, the term of this patent is extended or adjusted under 35 U.S.C. 154(b) by 97 days.

(21) Appl. No.: 16/514,942

(22) Filed: Jul. 17, 2019

(65) Prior Publication Data
US 2021/0021509 A1  Jan. 21, 2021

(51) Int. Cl.
| | |
|---|---|
| *H04L 45/00* | (2022.01) |
| *H04L 12/46* | (2006.01) |
| *H04L 45/16* | (2022.01) |
| *H04L 45/7453* | (2022.01) |
| *H04L 45/745* | (2022.01) |
| *H04L 45/50* | (2022.01) |
| *H04L 49/354* | (2022.01) |
| *H04L 45/02* | (2022.01) |
| *H04L 101/677* | (2022.01) |

(52) U.S. Cl.
CPC ......... *H04L 45/04* (2013.01); *H04L 12/4641* (2013.01); *H04L 45/16* (2013.01); *H04L 45/66* (2013.01); *H04L 61/6077* (2013.01)

(58) Field of Classification Search
None
See application file for complete search history.

(56) References Cited

U.S. PATENT DOCUMENTS

| | | | |
|---|---|---|---|
| 10,382,217 B1 * | 8/2019 | Kebler | H04L 45/02 |
| 2009/0213859 A1 * | 8/2009 | De Silva | H04L 45/52 |
| | | | 370/395.53 |
| 2012/0246282 A1 * | 9/2012 | Oguchi | H04L 12/66 |
| | | | 709/221 |
| 2015/0281096 A1 * | 10/2015 | Boutros | H04L 12/1886 |
| | | | 370/231 |

(Continued)

OTHER PUBLICATIONS

"Virtual Private Wire Service Support in Ethernet VPN (RFC8214)", Boutros, 2017 (Year: 2017).*

(Continued)

*Primary Examiner* — Jay L Vogel
(74) *Attorney, Agent, or Firm* — Patterson + Sheridan, LLP

(57) ABSTRACT

Techniques for routing traffic across different virtual local area networks (VLANs) within a single bridge domain are described. One technique includes receiving at a first network device a packet from a second network device on a first interface of multiple interfaces within a bridge domain at the first network device. Attachment circuit information associated with the packet is determined. An information element that includes an indication of the attachment circuit information is generated. The information element is transmitted to the third network device.

13 Claims, 9 Drawing Sheets

(56) References Cited

U.S. PATENT DOCUMENTS

| | | | |
|---|---|---|---|
| 2016/0277210 A1* | 9/2016 | Lin | H04L 45/66 |
| 2017/0201389 A1* | 7/2017 | Tiruveedhula | H04L 45/745 |
| 2018/0034667 A1* | 2/2018 | Sharma | H04L 12/4675 |
| 2018/0287946 A1* | 10/2018 | Nagarajan | H04L 63/0272 |
| 2018/0331953 A1* | 11/2018 | Hoang | H04L 45/50 |
| 2019/0149462 A1* | 5/2019 | Semwal | H04L 12/4641 |
| | | | 370/392 |
| 2019/0305988 A1* | 10/2019 | Bickhart | H04L 12/4633 |
| 2020/0014623 A1* | 1/2020 | Wang | H04L 12/46 |

OTHER PUBLICATIONS

Sajassi et al., "AC-Aware Bundling Service Interface in EVPN," BESS WorkGroup—Internet Draft, Cisco Systems, Oct. 22, 2018.

* cited by examiner

US 11,388,084 B2

ETHERNET VIRTUAL PRIVATE NETWORK ATTACHMENT CIRCUIT AWARE VIRTUAL LOCAL AREA NETWORK BUNDLE SERVICE

TECHNICAL FIELD

Embodiments presented in this disclosure generally relate to network communication and, more specifically, to improved techniques for routing traffic across different virtual local area networks (VLANs) within a single bridge domain.

BACKGROUND

In a Multiprotocol Label Switching (MPLS) Ethernet virtual private network (EVPN), data centers are interconnected by means of an MPLS provider core network. Each data center may include devices that use the Multiprotocol-Border Gateway Protocol (MP-BGP) to dynamically communicate with each other. MP-BGP is a control plane based protocol that provides endpoint peer discovery and end-host reachability information distribution for overlay networks. An EVPN includes customer edge (CE) devices that are connected to provider edge (PE) devices, which form the edge of the MPLS infrastructure. A CE device can be a host, a router, a switch, etc. The PE devices provide Layer 2 virtual bridge connectivity between the CE devices. The PE devices participating in the EVPN instances can use the MP-BGP protocol to learn customer media access control (MAC) routes in the control plane.

An EVPN can support a single homing mode or a multi-homing mode. In a single homing mode, a CE device is connected to a single PE device. In a multi-homing mode, a CE device can be connected to multiple PE devices to provide redundant connectivity. For example, in EVPN multi-homed scenarios, a redundant PE device can maintain EVPN service and traffic forwarding in the event of network failures (e.g., PE device to CE device link failures, PE device failure, MPLS-reachability failure, etc.).

EVPN may also support integrated routing and bridging (IRB) deployments with multi-homing. For example, EVPN IRB enables Layer 3 forwarding among hosts across different internet protocol (IP) subnets, while maintaining the multi-homing capabilities of EVPN. In addition, EVPN IRB allows for EVPN hosts or subnets to communicate with IP VPNs. Given the increased use of EVPN-based multi-homing techniques, there has been a focus on providing further optimizations in terms of scalability, management, and security for EVPN-based multi-homing deployments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1A:
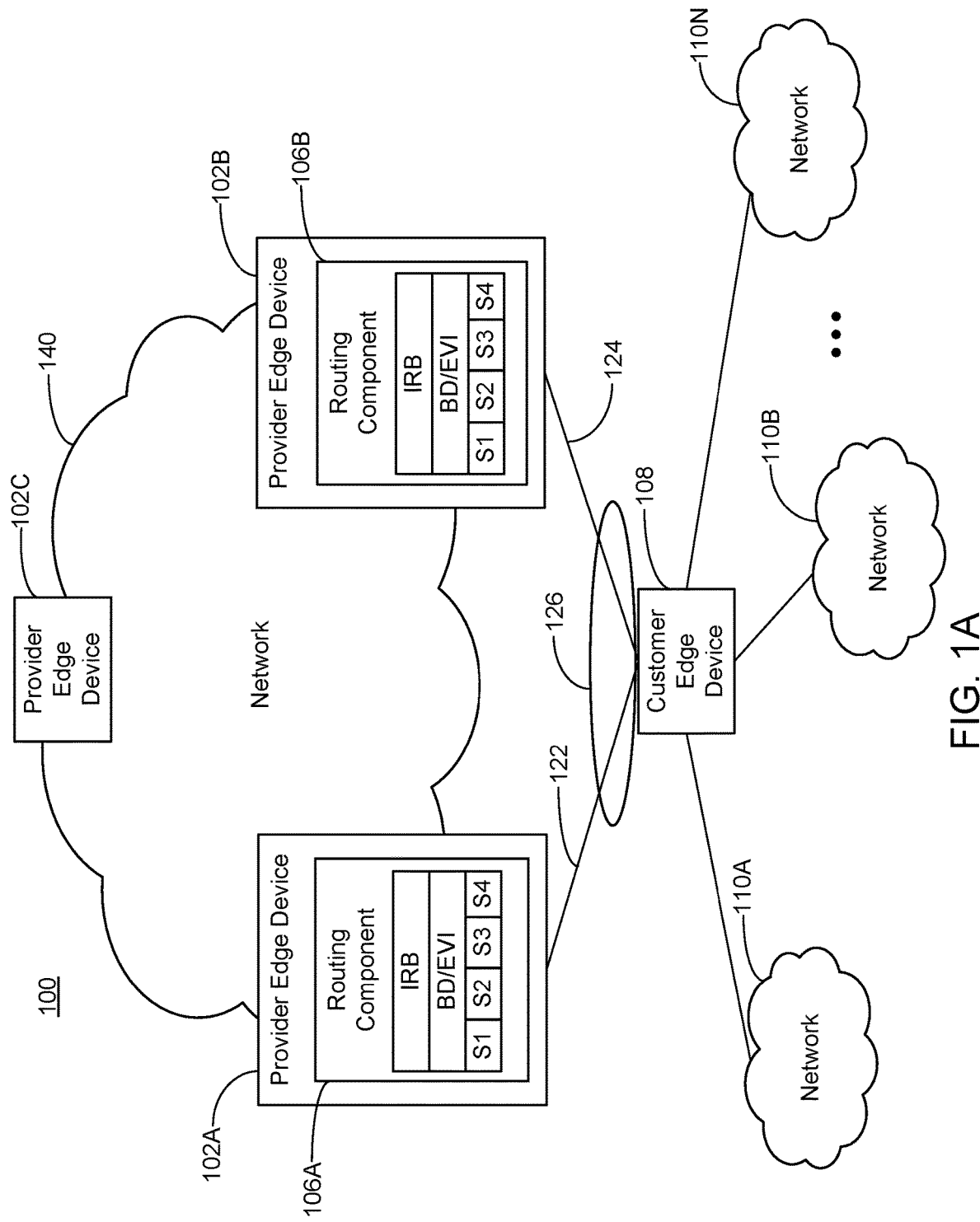
FIGS. 1A and 1B illustrate an example network topology, according to one embodiment.

One example embodiment provides a method that includes receiving, at a first network device, a packet from a second network device on a first interface of a plurality of interfaces within a bridge domain at the first network device. The method also includes determining attachment circuit (AC) information associated with the packet and generating an information element that includes an indication of the AC information. The method further includes transmitting the information element to a third network device.

Another example embodiment provides a first network device that includes a processor and a memory containing a program that, when executed by the processor, performs an operation. The operation includes receiving, at a first network device, a packet from a second network device on a first interface of a plurality of interfaces within a bridge domain at the first network device. The operation also includes determining attachment circuit (AC) information associated with the packet and generating an information element that includes an indication of the AC information. The operation further includes transmitting the information element to a third network device.

Another example embodiment provides a method that includes receiving, at a first network device, a packet from a second network device. The method also includes determining a media access control (MAC) address of the packet and attachment circuit (AC) information associated with the MAC address based on the packet. The method further includes updating a forwarding table at the first network device with the MAC address and the AC information associated with the MAC address.

Example Embodiments

In general, in EVPN IRB mode, multiple subnets can be supported with separate bridge domains (BDs) and IRB interfaces (e.g., N BDs and N IRB interfaces for N subnets). However, as the number of subnets increases in a given EVPN deployment, using a separate BD and IRB interface for each BD can lead to scalability issues and management problems. For example, it can be significantly complex and costly for customers to configure and manage N BDs and N IRB interfaces for N subnets.

One approach to address the above problems is allowing an EVPN deployment to support multiple subnets within a single BD (e.g., one BD for N subnets as opposed to N BDs for N subnets). Each subnet can be differentiated by a VLAN (e.g., have a different VLAN ID), which allows a single IRB interface to serve the multiple subnets (e.g., as opposed to N IRB interfaces for N subnets). However, conventional EVPN service interfaces, such as the VLAN-based service interface, VLAN bundle service interface, and the VLAN-aware bundle service interface, etc., used for EVPN-based multi-homing deployments are not able to support multiple subnets in a single BD. Further, in general, to have multiple subnets per BD, the MAC address cannot be duplicated across subnets. That is, the MAC addresses of the hosts should be unique across all of the VLANs that are put into a single BD.

Accordingly, embodiments provide techniques that allow for an EVPN deployment to support multiple subnets using a single BD (e.g., 1 BD for N subnets as opposed to N BDs for N subnets). More specifically, embodiments provide a new service interface (referred to herein as an "attachment circuit (AC)-aware VLAN bundle service interface") that is able to support IRB services with multiple subnets accommodated by a single BD. In embodiments herein, each PE device includes a routing component that is configured to implement the AC-aware VLAN bundle service interface. Within this service interface, each subnet is assigned a different VLAN ID and treated as a sub-interface, and each sub-interface is placed into a single BD.

In embodiments herein, upon receiving a (unicast) packet (e.g., from a CE device), the PE device learns the MAC address along with the sub-interface (e.g., subnet/VLAN) the packet has been received on. The PE device passes the MAC address along with the EVPN MAC/IP advertisement route information (e.g., route type (RT)-2 information) to other PE devices. In addition to the RT-2 information, the PE device uses a new extended community (referred to herein as AC ID extended community) (described in more detail below) to pass the VLAN information associated with each sub-interface to other PE devices. In one embodiment, the AC ID extended community that is passed along with the RT-2 information is processed by PEs that are members of the multi-homing group (or redundancy group) and is ignored (e.g., not processed) by remote PEs that are not part of the multi-homing group.

Upon receiving the RT-2 information with the AC ID extended community, a PE device can program their forwarding table with the corresponding VLAN ID (e.g., determined based on the AC ID extended community) and the MAC address for that BD. In this manner, the multi-homing PEs are able to synchronize MAC/IP addresses among themselves and synchronize AC IDs (over which these MAC/IP addresses are received) among themselves.

In other embodiments herein, upon receiving a (multicast) packet (e.g., a membership request, etc.), the PE device learns the sub-interface (e.g., subnet/VLAN) the packet has been received on and generates multicast route advertisement information (e.g., join sync route, multicast Ethernet tag route, etc.) that includes an indication of the sub-interface associated with the multicast route advertisement information. As described below, the PE device may reuse one of the fields (e.g., Ethernet tag field) in the multicast route advertisement information to include the indication of the associated sub-interface.

In addition to the multicast route advertisement information, the PE device generates the new extended community described herein (e.g., AC ID extended community) (which is transmitted along with the multicast route advertisement information) to aid the receiving PE device in processing the multicast route advertisement information. That is, the PE device uses the AC ID extended community to indicate to the receiving PE device how to interpret (or process) the multicast route advertisement information. For example, the PE device can pass a predefined value in the AC ID extended community to indicate to the receiving PE device that the Ethernet tag field in the multicast route advertisement information includes an indication of the associated sub-interface.

Upon receiving the multicast route advertisement information with the AC ID extended community, a receiving PE device can determine to which sub-interface of the multiple sub-interfaces within single bridge domain at the receiving PE device the multicast route advertisement information belongs, based on the multicast route advertisement information and the AC ID extended community. For example, if receiving PE device detects the predefined value within the AC ID extended community, the receiving PE device can use the value within the Ethernet tag ID field of the multicast route advertisement information to determine the sub-interface associated with the multicast route advertisement information. On the other hand, if the receiving PE device does not detect the predefined value within the Ethernet tag ID field (e.g., the AC ID extended community includes another value, the receiving PE device does not detect the AC ID extended community, etc.), the receiving PE device may process the Ethernet tag ID field in another manner (e.g., the Ethernet tag ID field may indicate that another service interface, such as the VLAN bundle service interface, VLAN-based service interface, VLAN-aware bundle service interface, etc. is being used). Note, embodiments herein may assume that MAC addresses across different subnets for a given tenant are unique.

Figure 1B:
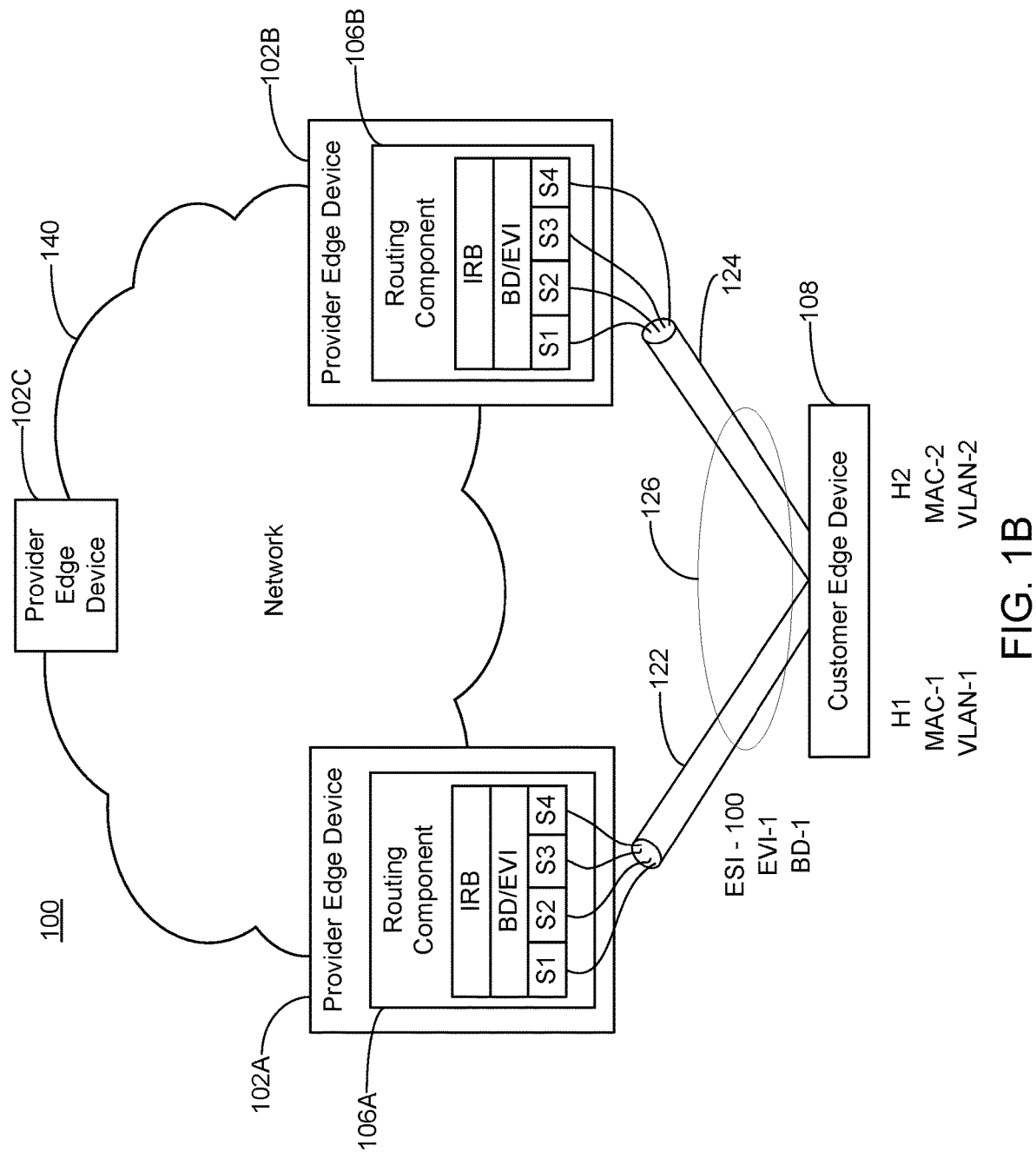

FIGS. 1A and 1B illustrate an example network 100 in which aspects of the present disclosure may be practiced. For example, as described in more detail below, techniques allow for the PE devices 102A and 102B (via routing components 106A and 106B) to implement an EVPN AC-aware VLAN bundle service, in which multiple subnets can be supported within a single BD, e.g., on each PE device 102A and 102B. Note that while FIGS. 1A and 1B depict PE devices 102A and 102B each with a single BD, in other embodiments, the PE devices 102A and 102B can include multiple BDs, and each BD can include one or more sub-interfaces (e.g., subnets).

The network 100 generally includes a provider network 140 that routes network traffic (e.g., of data, voice, and the like) between various customer networks 110A, 110B, and 110C. As shown, the customer networks 110A, 110B, and 110C may connect to the provider network 140 via CE device(s) 108 which is connected to PE devices 102A and 102B. While not shown, in some embodiments, the provider network 140 may also include a "fabric" of intermediate network devices, such as switches and routers that route and support traffic between the PE devices 102A and 102B. The CE device(s) 108 can include a host(s), router(s), switch(es), etc. Similarly, the PE devices 102A and 102B can include routers, switches, etc.

The provider network 140 may be a network that supports a packet transport protocol. In one embodiment, the packet transport may be a version of IP (e.g., IPv4, IPv6, etc.). In another embodiment, the packet transport may be MPLS.

For example, the provider network 140 may be a MPLS network that forwards IP traffic using labels. As used herein, such a network may be referred to as an IP/MPLS network. These labels may instruct the routers and the switches in the provider network 140 where to forward packets as they are routed between PE devices 102 en route to CE device(s) 108 at the customer networks 110 based on pre-established IP routing information.

Each of the customer networks 110A, 110B, and 110C may serve a particular geographical location and/or provide a particular type of service. The type of service may depend on the type of users within the customer networks. For example, a given customer network can include various multicast users, such as IP television (IPTv) users, small businesses, data centers, etc.

In some embodiments, the network 100 is an EVPN with one or more EVPN instances. An EVPN instance (EVI) can include one or more broadcast domains (e.g., one or more VLANs) (depending on the service interface). In the particular embodiment depicted in FIG. 1, the network 100 includes a single EVI (e.g., EVI-1) spanning PE devices 102A, 102B, and 102C. The PE devices 102A and 102B are multi-homed remote peers with respect to each other. PE device 102C is a non multi-homed remote peer with respect to PE devices 102A and 102B.

In this multi-homing scenario, CE device 108 has two potential paths (e.g., via PE device 102A and PE device 102B) to reach the provider network 140. As shown, a first link (e.g., Ethernet link) 122 is formed between CE device 108 and PE device 102A and a second link (e.g., Ethernet link) 124 is formed between CE device 108 and PE device 102B. The first and second links 122, 124 form an ethernet segment 126. The first and second links 122, 124 that constitute Ethernet segment 126 form a BD (e.g., BD-1) and is assigned an Ethernet segment identifier (ESI) (e.g., ESI-100). Note that although a single ESI-100 is depicted in FIGS. 1A and 1B, the network 100 can include multiple ESIs between a BD at a PE device and one or more CE devices. For example, the BD at PE device 102A could be connected to a first CE device (e.g., CE device 108A) via a first ESI (e.g., ESI-100) and connected to a second CE device (e.g., CE device 108B) via a second ESI (e.g., ESI-200).

In an EVPN, the forwarding of unicast packets and multicast packets occurs in the data plane. For example, in the case of unicast packets, when a PE device (e.g., PE device 102A) receives a packet from a CE device (e.g., CE device 108) on a given Ethernet tag ID, the PE device determines the source MAC address of the packet (e.g., to validate the host identity, determine the traffic from the host that is allowed into the network, local MAC address learning, etc.). Once the PE device determines to forward the packet, the PE device determines the destination MAC address of the packet. If the PE device determines that it has received MAC address advertisements for the destination MAC address from one or more other PE devices or has learned it from locally connected CE devices, then the MAC address is considered a known MAC address. On the other hand, it is considered an unknown MAC address. The PE device can forward packets that have known MAC addresses to one of the remote PE devices (e.g., PE devices 102B, 102C) or to a locally attached CE device. If the MAC address is unknown, the PE device may flood the packet to other PEs or drop the packet, depending on whether the network supports flooding of unknown unicast traffic.

When a PE device (e.g., PE device 102A) receives a (unknown unicast) packet (e.g., MPLS packet) from a remote PE, the PE device determines the Ethernet tag based on the MPLS label of the packet and determines whether it is the designated forwarder (DF) of BUM (e.g., broadcast, unknown unicast, multicast) traffic on a particular set of ESIs for the Ethernet tag. The PE device can determine to flood the packet or drop the packet, based on whether the PE device is the designated forwarder. For example, if the PE device is the designated forwarder, the PE device can determine to flood the packet to all or a subset of ESIs. In another example, if the PE device is not the designated forwarder on any ESIs for the Ethernet tag, the PE device can drop the packet.

When a remote PE device receives a (known unicast) packet (e.g., MPLS packet), the remote PE device determines, based on the MPLS label, whether the destination MAC address has been advertised in unicast MAC advertisements. If so, the PE device can forward the packet based on next-hop forwarding information associated with the label. If not, the PE device can perform a destination MAC address lookup to forward to the packet to its destination.

In general, when a PE device performs a destination MAC lookup on a known unicast packet, the destination MAC lookup returns the VLAN and port tuple information. For example, if PE device 102B receives a unicast packet that is destined to MAC address MAC-1 (e.g., the packet may be coming from IRB or remote PE with EVPN tunnel), the destination MAC lookup on PE device 102B can provide the outgoing port along with the associated MAC address. In this example, the traffic will be forwarded to subnet S1 with VLAN 1.

In an EVPN, MAC learning between PE devices 102A and 102B occurs in the control plane, e.g., via MP-BGP. For example, PE devices 102A and 102B advertise the MAC addresses learned from the CE devices that are connected to them, along with an MPLS label, to other PE devices in the control plane using MP-BGP. PE devices 102A and 102B may learn how to reach a given destination via local learning and remote learning. In local learning, the PE devices 102A and 102B learn the MAC addresses from the CE device(s) (e.g., CE device 108) that are connected to each of them. In remote learning, the PE devices 102A and 102B learn MAC addresses in the control plane from MAC/IP advertisement routes advertised by other PE devices. For example, each PE device 102 can be configured to advertise the MAC addresses it learns from its locally attached CE device in the control plane to all the PEs in that EVI, using MP-BGP and the MAC/IP advertisement route. The MAC/IP advertisement route (e.g., RT-2 information) generally includes one or more of a route distinguisher (RD), an ESI, an EVI, an Ethernet tag ID, a MAC address length, a MAC address, an IP address length, an IP address, and one or more MPLS labels.

However, with conventional techniques, there may be some issues with unicast MAC processing in multi-homing scenarios, multicast route synchronization, and security issues caused by misconfigurations.

In the case of unicast MAC route processing, for example, FIG. 1B shows a scenario in which the BD (e.g., BD-1) has multiple subnets and each subnet is distinguished by VLANs 1, 2, 3, and 4. Assume PE device 102A learns MAC address MAC-1 from the AC associated with subnet S1 and uses a MAC route to advertise MAC-1 presence to peer PE device 102B. In this case, with conventional techniques, because the MAC route advertisement from PE device 102A does not carry any context that can provide information about the MAC address association with AC, the PE device 102B cannot determine which AC (e.g., subnet S1, S2, S3, S4) the MAC address MAC-1 belongs to, e.g., when it receives the MAC route. Further, since the PE device 102B cannot bind MAC-1 with the correct AC, when it receives data traffic destined to MAC-1, it will not be able to find the correct AC where data is to be forwarded.

In the case of multicast route synchronization, assume that a receiver behind subnet S1 sends a membership request (e.g., Internet Group Management Protocol (IGMP) membership request) to CE device 108. In this case, the CE device 108 can send (e.g., based on a hash) the membership request to PE device 102A or PE device 102B. However, when the PE device (that receives the membership request) originates the multicast route advertisement, the multicast route advertisement will not include any information regarding the AC (corresponding to the subnet) associated with the multicast route advertisement. In this situation, when the multicast route advertisement reaches a remote PE (e.g., PE 102B), it will not have any information regarding the subnet that the membership request belongs to.

Further, in cases where a BD is configured with a single subnet, there may be security issues caused by misconfigurations, which can lead to a PE device forwarding multicast traffic to unintended hosts. For example, assume PE device 102A (on BD-1) is configured with VLAN 1 and PE device 102B (on BD-1) is (mis)-configured with VLAN 2. In this scenario, if a membership request received by PE device 102A is synchronized to PE device 102B (without any information as to the subnet to which the membership request belongs), PE device 102B would process multicast routes and start forwarding multicast traffic on VLAN-2, which is not intended.

Accordingly, to address the above issues, embodiments provide a new service interface (e.g., AC-aware VLAN bundle service interface) that is able to support multiple subnets using a single BD. In one embodiment, embodiments use a new extended community (e.g., AC ID extended community) to pass the VLAN information associated with each sub-interface to other PE devices.

Referring to FIG. 1B, in one embodiment, for unicast MAC learning, a PE device learns (or determines) the MAC address and the VLAN associated with the AC from a packet that it receives from a CE device. Using FIG. 1B as a reference example, host H1 on VLAN-1 has MAC address MAC-1 and host H2 on VLAN-2 has MAC address MAC-2. In this example, assuming PE device 102A receives a packet from host H1 on VLAN-1 (e.g., subnet S1), the PE device 102A learns the MAC address MAC-1 and the associated VLAN information (e.g., VLAN-1). Once learned, the PE device constructs an MAC/IP advertisement route (e.g., RT-2 information) and attaches the AC ID extended community to identify the particular VLAN ID (e.g., VLAN-1) (and in turn, the particular subnet) that the packet was received from.

In one embodiment, for remote unicast MAC learning, remote PE devices (e.g., that are not multi-homed with any other PE devices) may ignore the presence of the AC ID extended community when processing the MAC/IP advertisement route. On the other hand, multi-homing PE peers can process the AC ID extended community to attach a remote MAC address to the appropriate VLAN ID within the BD. Using FIG. 1B as a reference example, assuming PE device 102C (which is a non multi-homed remote PE device) receives a MAC/IP advertisement route for MAC address MAC-1, the PE device 102C can ignore the AC information in the AC ID extended community received with the MAC/IP advertisement route, e.g., when processing the MAC/IP advertisement route. Still referring to FIG. 1B, assuming PE device 102B (which is a multi-homed remote PE device) receives a MAC/IP advertisement route for MAC address MAC-1, the PE device 102B can determine the VLAN ID from the AC ID extended community received with the MAC/IP advertisement route and associate the MAC address with a specific VLAN/subnet, based on the VLAN ID.

Embodiments additionally provide techniques for incorporating the AC ID extended community in multicast route advertisements (e.g., IGMP join sync routes). In general, when a local multi-homed bridge port (of a PE device) in a given BD receives a membership request (e.g., IGMP membership request) and the Ethernet segment is in all-active or single-active redundancy mode, the PE device can synchronize the multicast state by originating (or constructing) a multicast route advertisement, such as a IGMP join synch route. The IGMP join synch route, for example, is generally used to coordinate IGMP join (x, g) state for a given BD between PE devices attached to a given Ethernet segment operating in all-active or single-active redundancy mode. The IGMP join synch route may include one or more of the following: a RD, an ESI, an EVI, an Ethernet tag ID, a multicast source length, a multicast source address, a multicast group length, a multicast group address, an originator router length, an originator router address, and one or more flags.

In one embodiment, for PE devices that are able to implement the AC-aware VLAN bundle service interface described herein, the PE device originating a multicast route advertisement may attach the AC ID extended community along with the multicast route advertisement. Referring to FIG. 1B, for example, assume host H2 sends an IGMP membership request for (source (S), group (G)) on subnet S2, where (S,G) routes flow from a source to a group based on the IP address multicast source and the IP address of the multicast group destination, and the CE device 108 hashed (and sent) the IGMP membership request to PE device 102A. When PE device 102A receives the IGMP membership request on subnet S2, PE device 102A can originate the multicast route advertisement to synchronize the multicast state with PE device 102B. The PE device 102A can include the AC ID extended community along with the multicast route.

In another example, assuming PE device 102A had already originated a multicast route advertisement for (S, G) from subnet S2 and subsequently receives a membership request from host H1 for (S, G) on subnet S1, the PE device 102A can originate an multicast route advertisement update with the AC ID extended community (e.g., indicating subnet S1).

In one embodiment, rather than include an indication of the subnet associated with the multicast route advertisement in the AC ID extended community, the PE device 102A can reuse the Ethernet tag field in the multicast route advertisement to include the indication of the associated subnet (e.g., VLAN-ID). In this embodiment, the PE device 102A may use the AC ID extended community to indicate to the receiving PE device 102B how to process the Ethernet tag field. For example, the PE device 102A can include a predefined value in the Ethernet tag field to indicate to PE device 102B that the Ethernet tag field in the multicast route advertisement includes the VLAN ID (of the subnet) that is associated with the multicast route advertisement.

When a multi-homed PE device receives a remote multicast route advertisement on a BD for a given Ethernet segment, the PE device can program the route to the correct subnet, based on the AC ID extended community. Still referring to FIG. 1B, when PE device 102B receives a multicast route advertisement on BD BD-1 for Ethernet segment ESI-100, the PE device 102B can extract AC information from the AC ID extended community included with the multicast route advertisement, and associate the membership request (S, G) to subnet S1, based on the VLAN ID in the AC ID extended community. In one embodiment, when the PE device 102B receives a route update with AC ID extended community added for subnet S1, the PE device 102B can add the port associated with the subnet S1 for the multicast route advertisement.

Figure 2:
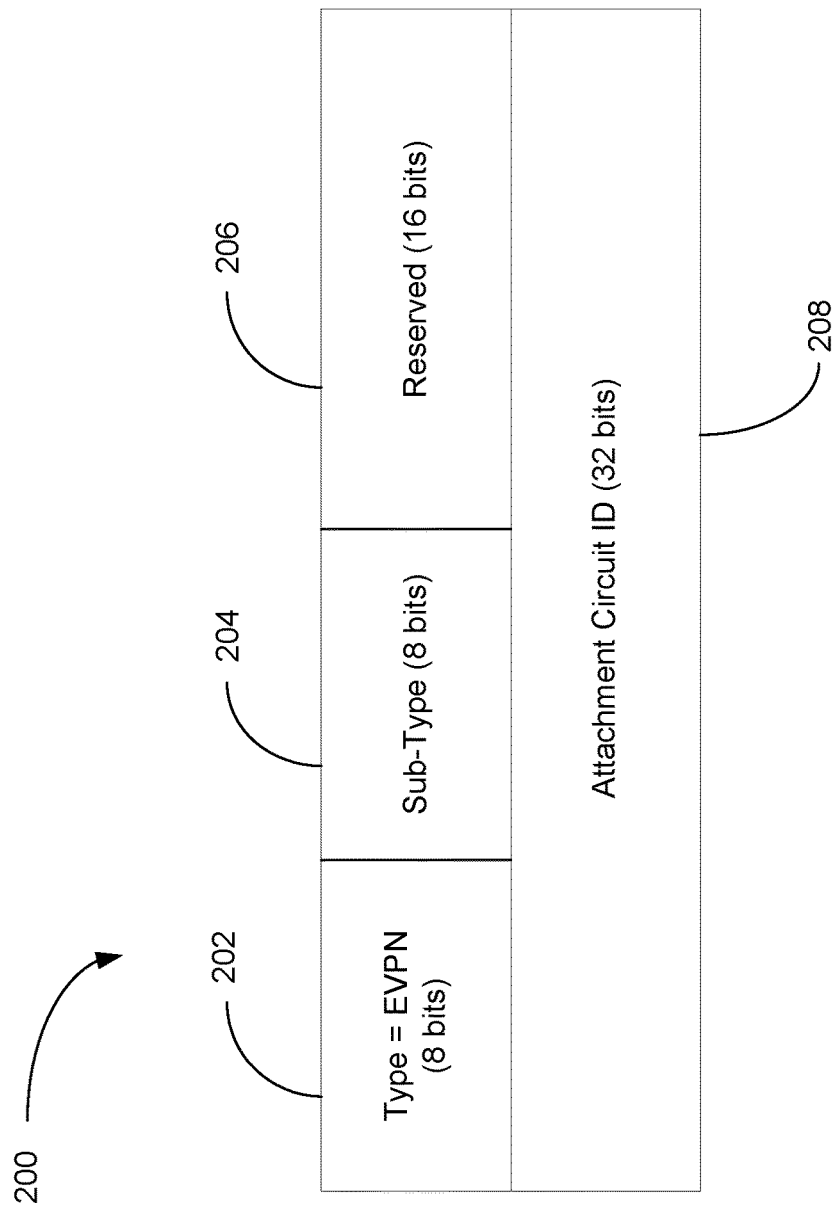
FIG. 2 illustrates an example of an attachment circuit (AC) ID extended community, according to one embodiment.

FIG. 2 illustrates a reference example of an AC ID extended community 200, according to one embodiment. The AC ID extended community can be used to enable the EVPN AC-aware VLAN bundle service described herein. As shown, the AC ID extended community 200 includes a type field 202, a subtype field 204, a reserved field 206, and an AC ID field 208. The type field 202 indicates that the extended community is for EVPN. In one embodiment, the subtype field 204 can be used to indicate that the extended community is for an AC-aware VLAN bundle service.

In embodiments described herein, the AC ID extended community 200 (via AC ID field 208) is used to carry the AC ID (e.g., VLAN ID) associated with the received MAC address. The AC ID extended community 200 is advertised along with EVPN MAC/IP advertisement route and the EVPN multicast advertisement route. In one embodiment, the receiving PE device that is in a multi-homing group with at least another PE device (e.g., in all-active or single-active multi-homing) can use the AC ID to synchronize the MAC address and the associated subnet over which the MAC address is received. In another embodiment, the receiving PE device can use the AC ID to determine the subnet (within a BD) that is associated with the received membership request/multicast route advertisement.

Figure 3:
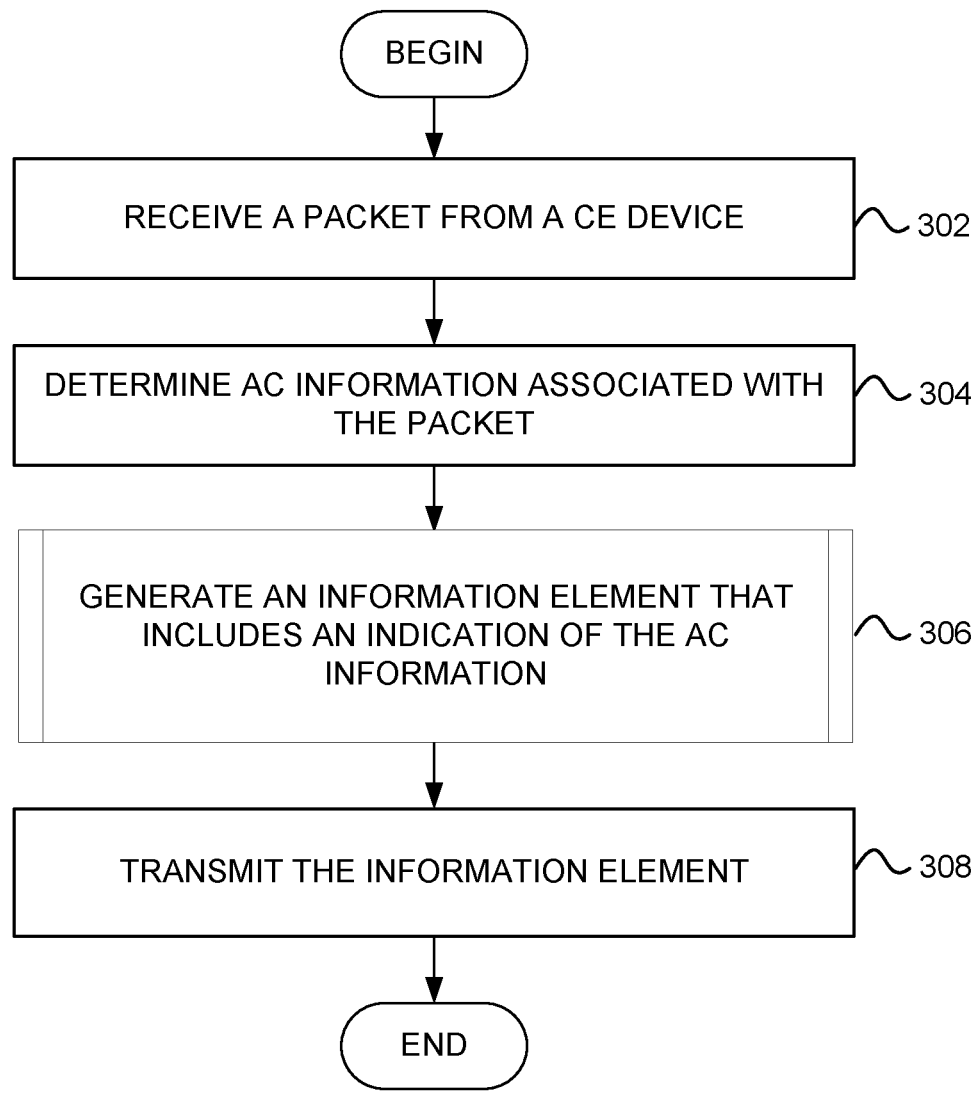
FIG. 3 is a flowchart of a method for supporting multiple subnets within a single bridge domain, according to one embodiment.

FIG. 3 is a flowchart of a method 300 for supporting multiple subnets within a single bridge domain (BD), according to one embodiment. The method 300 may be performed by a routing component (e.g., routing component 106) of a PE device (e.g., PE device 102). In one embodiment, the routing component is configured to implement an AC aware VLAN bundle service interface.

As shown, method 300 begins at block 302, where the routing component receives a packet from a CE device. The packet may be a unicast packet or a multicast packet. In one embodiment, the routing component receives the packet on a subnet of multiple subnets configured for a single bridge domain at the PE device. In one reference example shown in FIG. 1B, the routing component may receive a packet on subnet S1/VLAN-1. At block 304, the routing component determines at least AC information (e.g., VLAN information) associated with the packet. For example, in the case of a unicast packet, the routing component may determine the particular subnet (e.g., VLAN ID) associated with a MAC address learned from the packet, based on the subnet the packet is received on. In another example, in the case of a multicast packet, the routing component may determine the particular subnet (e.g., VLAN ID) associated with the multicast packet, based on the subnet the packet is received on.

At block 306, the routing component generates an information element that includes an indication of the AC information. In one embodiment, the information element can be an AC ID extended community (e.g., AC ID extended community 200) that is included within the packet. For example, the AC ID extended community can be included in addition to the EVPN MAC/IP advertisement route information (e.g., RT-2 information) within the packet or the AC ID extended community can be included in addition to the EVPN multicast advertisement route information within the packet. In another embodiment, the information element can be a multicast route advertisement. For example, the multicast route advertisement can include an Ethernet tag field that indicates the AC information. At block 308, the routing component transmits at least the information element.

Figure 4:
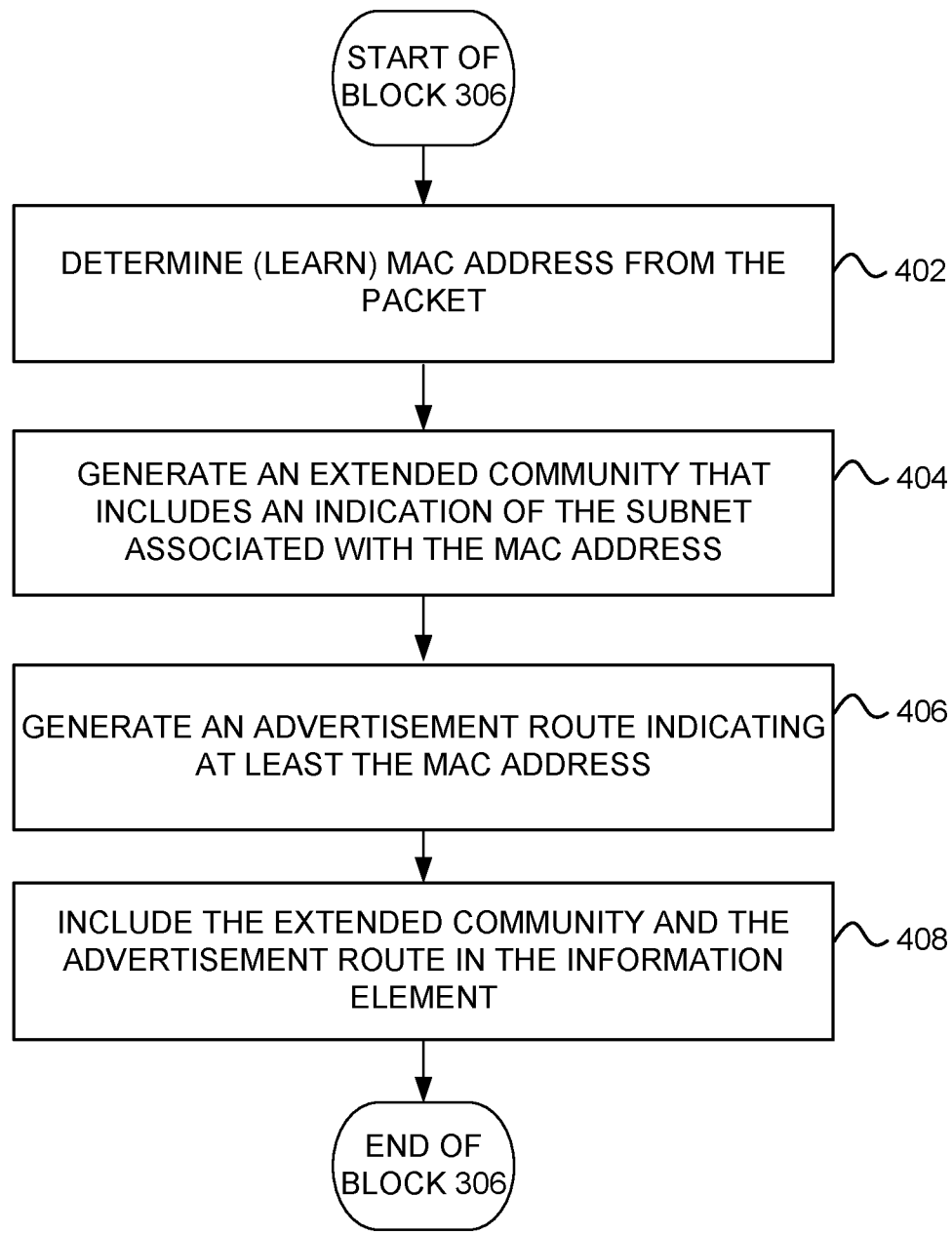
FIG. 4 is a flowchart of a method for generating an information element that includes AC information, according to one embodiment.

FIG. 4 is a flowchart of a method 400 for generating an information element that includes AC information, according to one embodiment. The method 400 may be performed by a routing component (e.g., routing component 106) of a PE device (e.g., PE device 102). In one embodiment, the method 400 may be performed as part of block 306 of method 300 depicted in FIG. 3.

As shown, method 400 begins at block 402, where the routing component determines (e.g., learns) a MAC address from the packet. At block 404, the routing component generates an extended community (e.g., AC ID extended community 200) that includes an indication of the subnet associated with the MAC address. For example, the AC ID field (e.g., AC ID field 208) may include the VLAN ID of the subnet that is associated with the MAC address. At block 406, the routing component generates an advertisement route indicating at least the MAC address. At block 408, the routing component includes the extended community and the advertisement route in the information element.

Figure 5:
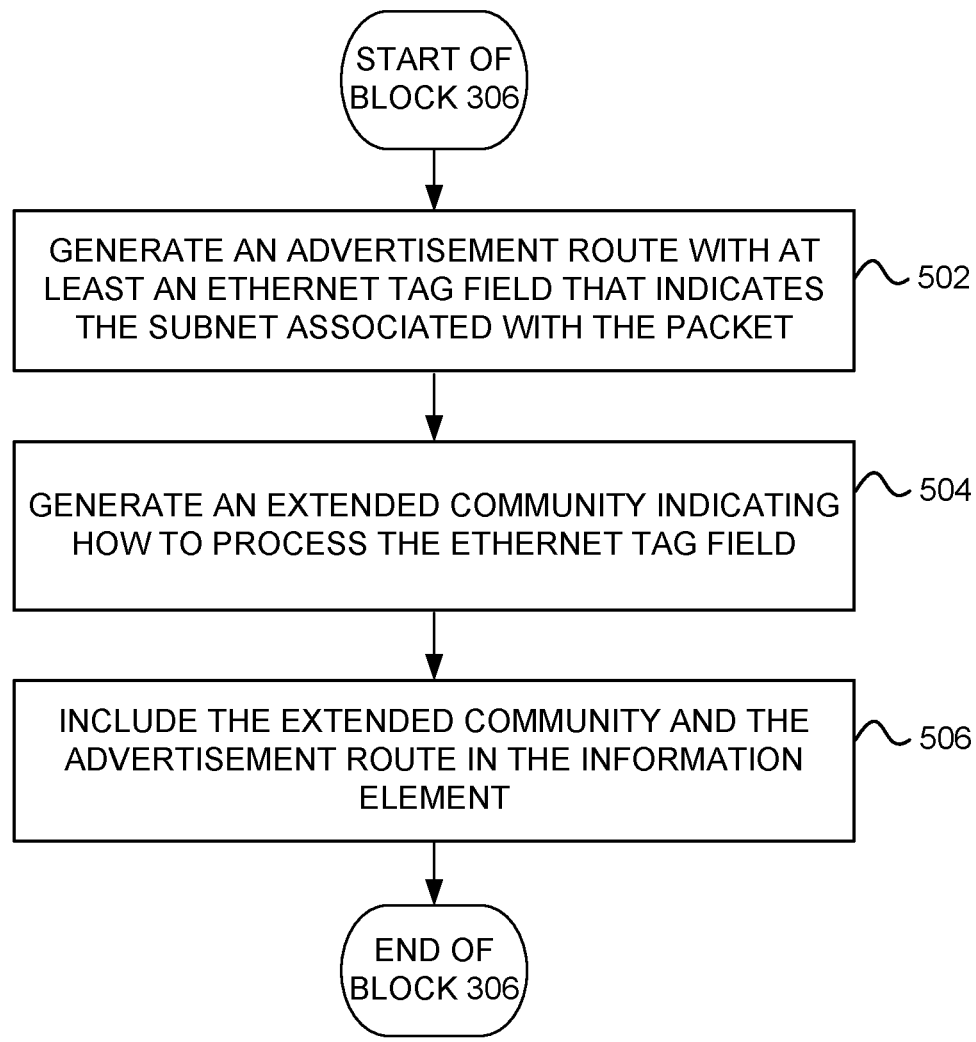
FIG. 5 is a flowchart of another method for generating an information element that includes AC information, according to one embodiment.

FIG. 5 is a flowchart of a method 500 for generating an information element that includes AC information, according to one embodiment. The method 500 may be performed by a routing component (e.g., routing component 106) of a PE device (e.g., PE device 102). In one embodiment, the method 500 may be performed as part of block 306 of method 300 depicted in FIG. 3.

As shown, method 500 begins at block 502, where the routing component generates an advertisement route with at least an Ethernet tag field that indicates the subnet associated with the packet. As noted, the advertisement route can include a multicast route advertisement (e.g., join sync route) for the packet (e.g., membership request). At block 504, the routing component generates an extended community (e.g., AC ID extended community 200) indicating how to process the Ethernet tag field. At block 506, the routing component includes the extended community and the advertisement route in the information element.

Figure 6:
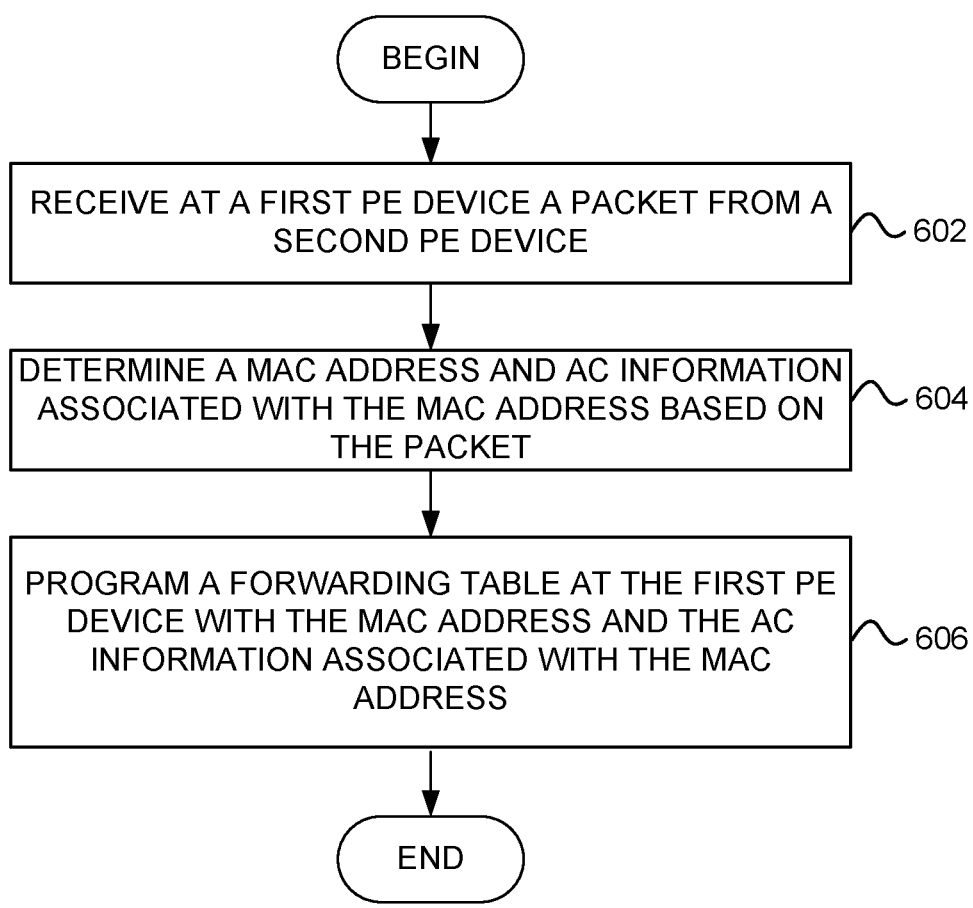
FIG. 6 is a flowchart of a method for processing a packet at a network device having multiple subnets within a single bridge domain, according to one embodiment.

FIG. 6 is a flowchart of a method 600 for processing a packet at a network device having multiple subnets within a single bridge domain (BD), according to one embodiment. The method 600 may be performed by a routing component (e.g., routing component 106) of a PE device (e.g., PE device 102). In one embodiment, the routing component is configured to implement an AC aware VLAN bundle service interface.

As shown, the method 600 begins at block 602, where the routing component receives at a first PE device (e.g., PE device 102A) a packet from another (second) PE device (e.g., PE device 102B). At block 604, the routing component determines a destination MAC address and AC information associated with the MAC address, based on the packet. In one embodiment, for example, the packet includes an extended community (e.g., AC ID extended community 200) that indicates the AC information (e.g., VLAN ID) associated with the MAC address. In one embodiment, the packet can also include EVPN MAC/IP advertisement route information (e.g., RT-2 information) within the packet. The EVPN MAC/IP advertisement route information indicates at least the MAC address learned from the packet.

At block 606, the routing component programs (or updates) a forwarding table (e.g., VRF) at the first PE device (e.g., PE device 102A) with the MAC address and the AC information associated with the MAC address. For example, using the AC information, the routing component can associate the MAC address from the packet with one of several subnets configured within the same BD at the first PE device. In this manner, embodiments enable the receiving (first) PE device to synchronize the MAC address in addition to the associated AC over which the MAC address is received.

In one embodiment, the routing component at the first PE device (as part of method 600) may receive another packet from a third PE device (e.g., PE device 102C). The third PE device may be a remote PE device that is non-multi-homed with respect to the CE device 108. The packet from the third PE device may be destined for the CE device. For example, the packet may indicate the MAC address of the CE device. However, the packet may not indicate the subnet associated with the MAC address. In this situation, the routing component (at the first PE device) may forward the packet based on its updated forwarding table. For example, the routing component may determine, based on the updated forwarding table, the subnet within the BD (at the first PE device) that is associated with the MAC address, and transmit the second packet to the CE device over the first subnet. In this manner, when a PE device receives a packet from a remote PE device, the PE device can forward the packet over the correct VLAN/AC because the forwarding table for the PE device was populated correctly. That is, the packet can be forwarded by the PE device to its attached CE device over the right subnet/AC even though the remote PE does not indicate the subnet information when it sends the packet.

Figure 7:
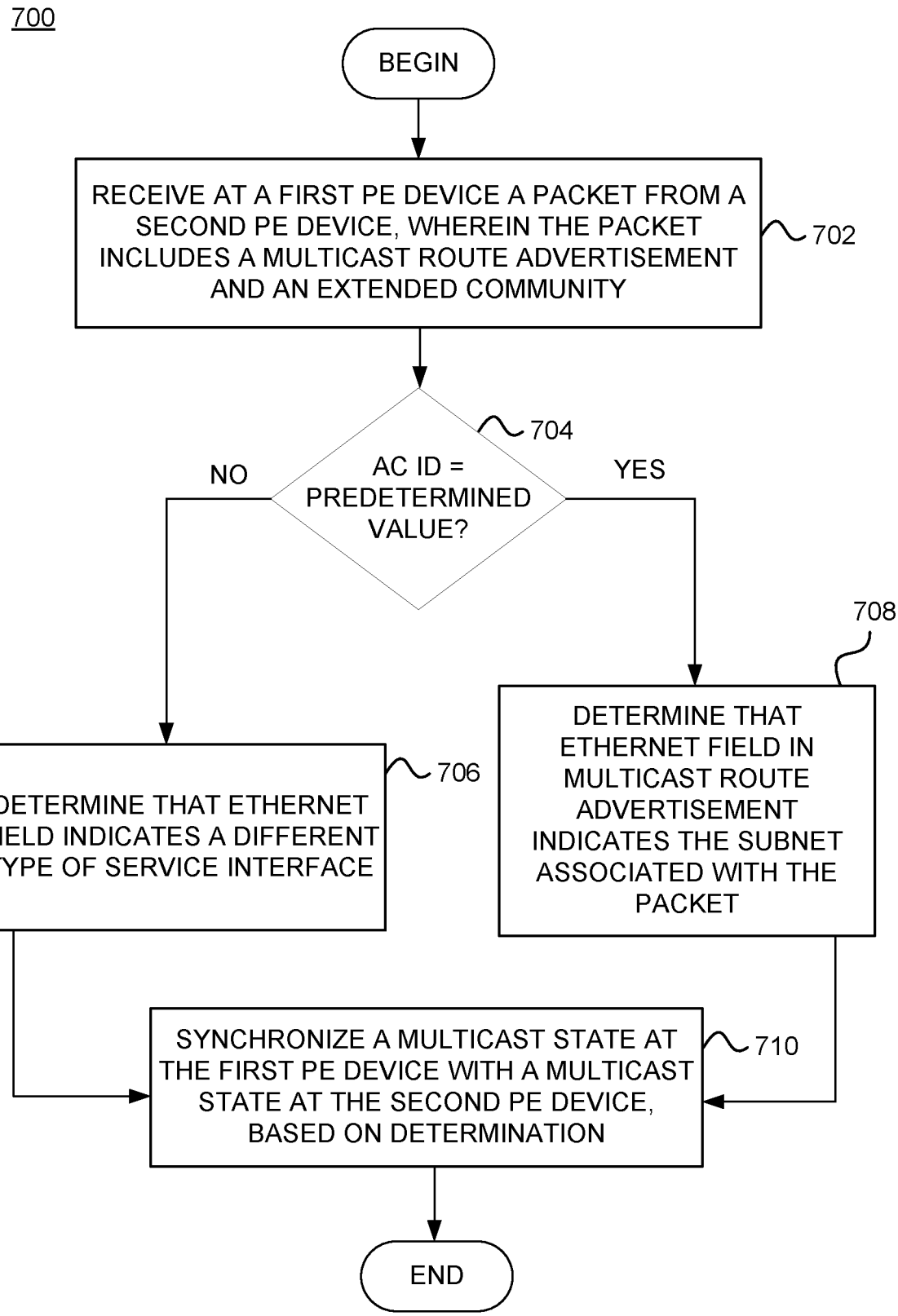
FIG. 7 is a flowchart of another method for processing a packet at a network device having multiple subnets within a single bridge domain, according to one embodiment.

FIG. 7 is a flowchart of a method 700 for processing a packet at a network device having multiple subnets within a single bridge domain (BD), according to one embodiment. The method 700 may be performed by a routing component (e.g., routing component 106) of a PE device (e.g., PE device 102). In one embodiment, the routing component is configured to implement an AC aware VLAN bundle service interface.

As shown, the method 700 begins at block 702, where the routing component receives at a first PE device (e.g., PE device 102A) a packet from another (second) PE device (e.g., PE device 102B). The packet includes a multicast route advertisement and an extended community. At block 704, the routing component determines whether the AC ID field in the extended community includes a predetermined value (e.g., 0xFFFF). If so, the routing component determines that the Ethernet tag field in the multicast route advertisement indicates the subnet associated with the packet (block 708).

On the other hand, if the extended community does not include the predetermined value (or, in some cases, if there is no extended community), the routing component determines that the Ethernet tag field indicates a different type of service interface (e.g., other than the AC-aware VLAN bundle service interface). At block 710, the routing component synchronizes a multicast state at the first PE device with a multicast state at the second PE device, based on the determination. For example, assuming the Ethernet tag field is used to indicate the subnet associated with the packet (e.g., multicast route advertisement), the PE device can associate the multicast route advertisement corresponding to a membership request with the indicated subnet. On the other hand, the routing component may synchronize the multicast state without the subnet information.

Figure 8:
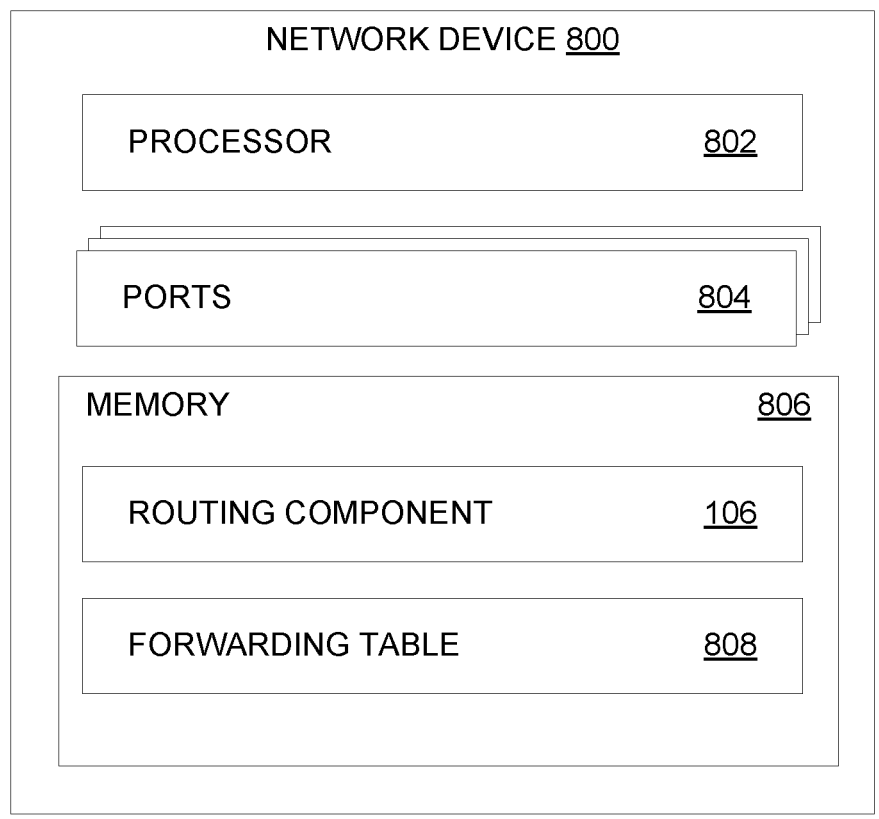
FIG. 8 illustrates an example network device, according to one embodiment.

FIG. 8 illustrates an example network device 800 configured with a routing component 106, according to one embodiment. In one embodiment, the network device 800 is representative of a PE device (e.g., PE device 102A, 102B, etc.). The network device 800 includes a processor 802, communication ports 804, and memory 806. The processor 802 may be any processing element capable of performing the functions described herein. The processor 802 represents a single processor, multiple processors, a processor with multiple cores, and combinations thereof. The communication ports 804 facilitate communication between the network device 800 and other network devices (e.g., PE devices, CE devices, etc.). The memory 806 may be either volatile or non-volatile memory and include RAM, flash, cache, disk drives and the like. Although shown as a single entity, the memory 806 may be divided into different memory storage elements such as RAM and one or more hard disk drives.

As shown, the memory 806 includes a routing component 106 and forwarding table 808. The routing component 106 is generally configured to implement an AC aware VLAN bundle service interface. For example, the routing component 806 may maintain multiple subnets (each with a different VLAN) within a single BD. The routing component 106 is configured to generate and/or process information (e.g., AC ID extended community) within a packet in order to indicate the particular AC that a MAC address learned from a packet is received on. Doing so enables the network device 800 (that receives this information) to synchronize the MAC address in addition to the associated AC over which the MAC address is received.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
   receiving, at a first network device, a multicast packet from a second network device, wherein:
     the first network device comprises an integrated routing and bridging (IRB) interface comprising a bridge domain comprising a plurality of subnets;
     the multicast packet is received on a first subnet of the plurality of subnets within the bridge domain of the IRB interface at the first network device; and
     each subnet of the plurality of subnets within the bridge domain is associated with a different virtual local area network (VLAN) identifier;
   determining, by the first network device, attachment circuit (AC) information associated with the multicast packet;
   generating, by the first network device, an information element that includes an advertisement route that includes an Ethernet tag field, wherein the Ethernet tag field includes an indication of the AC information, wherein the AC information comprises the VLAN identifier associated with the first subnet of the plurality of subnets within the bridge domain at the first network device;
   generating, by the first network device, an extended community comprising a predefined value that indicates that the Ethernet tag field comprises the indication of the AC information, wherein the information element further comprises the extended community; and
   transmitting, by the first network device, the information element to a third network device.

2. The computer-implemented method of claim 1, further comprising:
   receiving, at the first network device, a unicast packet from the second network device; and
   determining, by the first network device, a media access control (MAC) address of the unicast packet.

3. The computer-implemented method of claim 2, further comprising:

determining, by the first network device, AC information associated with the unicast packet;

generating, by the first network device, another information element comprising an indication of the AC information; and generating, by the first network device, another advertisement route comprising at least the MAC address of the unicast packet and an indication of the bridge domain, wherein the other information element comprises the other advertisement route.

4. The computer-implemented method of claim 3, wherein the other information element comprises an extended community that includes the indication of the AC information.

5. The computer-implemented method of claim 1, wherein:
the first network device and the third network device are provider edge (PE) devices;
the second network device is a customer edge (CE) device; and
the second network device is multi-homed to the first network device and the third network device.

6. The computer-implemented method of claim 1, wherein the information element is processed by network devices that are multi-homed with respect to the second network device and discarded by network devices that are non-multi-homed with respect to the second network device.

7. A first network device, comprising:
a processor; and
a memory containing a program that, when executed by the processor, performs an operation comprising:
receiving a multicast packet from a second network device, wherein:
the first network device comprises an integrated routing and bridging (IRB) interface comprising a bridge domain comprising a plurality of subnets;
the multicast packet is received on a first subnet of the plurality of subnets within the bridge domain of the IRB interface at the first network device; and
each subnet of the plurality of subnets within the bridge domain is associated with a different virtual local area (VLAN) identifier;
determining attachment circuit (AC) information associated with the multicast packet;
generating an information element that includes an advertisement route that includes an Ethernet tag field, wherein the Ethernet tag field includes an indication of the AC information, wherein the AC information comprises the VLAN identifier associated with the first subnet of the plurality of subnets within the bridge domain at the first network device;
generating an extended community comprising a predefined value that indicates that the Ethernet tag field comprises the indication of the AC information, wherein the information element further comprises the extended community; and
transmitting the information element to a third network device.

8. The first network device of claim 7, wherein the information element is processed by network devices that are multi-homed with respect to the second network device and discarded by network devices that are non-multi-homed with respect to the second network device.

9. The first network device of claim 7, wherein:
the first network device and the third network device are provider edge (PE) devices;
the second network device is a customer edge (CE) device; and
the second network device is multi-homed to the first network device and the third network device.

10. A computer-implemented method, comprising:
receiving, at a first network device, a first packet from a second network device, wherein:
the first packet comprises an information element that includes (i) an advertisement route that includes an Ethernet tag field and (ii) an extended community;
the first network device comprises a plurality of bridge domains;
each of the plurality of bridge domains comprises a plurality of subnets; and
for each of the plurality of bridge domains, each of the plurality of subnets within the bridge domain is associated with a different virtual local area network (VLAN) identifier;
upon determining, by the first network device, that a first field in the extended community includes a predefined value:
determining, by the first network device, that the Ethernet tag field in the advertisement route includes attachment circuit (AC) information associated with the first packet, wherein the predefined value indicates that the Ethernet tag field comprises an indication of the AC information; and
updating, by the first network device, a forwarding table at the first network device with the AC information, wherein the AC information comprises an indication of the VLAN identifier associated with a first subnet of the plurality of subnets within a first bridge domain associated with the first packet.

11. The computer-implemented method of claim 10, wherein the first network device and the second network device are provider edge (PE) devices.

12. The computer-implemented method of claim 10, further comprising:
receiving, at the first network device, a second packet from a remote network device, wherein the second packet indicates a MAC address but does not include an indication of a subnet associated with the MAC address; and
forwarding, by the first network device, the second packet to a customer edge (CE) device, based on the updated forwarding table, comprising:
determining, based on the updated forwarding table, that the first subnet is associated with the MAC address; and
transmitting the second packet to the CE device over the first subnet.

13. The computer-implemented method of claim 12, wherein:
the first network device and the remote network device are provider edge (PE) devices; and
the CE device is multi-homed to the first network device and the second network device.

* * * * *